(12) United States Patent
Zhong et al.

(10) Patent No.: US 8,760,956 B1
(45) Date of Patent: Jun. 24, 2014

(54) DATA PROCESSING METHOD AND APPARATUS

(71) Applicant: Huawei Technologies Co., Ltd., Guangdong (CN)

(72) Inventors: Yanhui Zhong, Chengdu (CN); Zongquan Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/140,945

(22) Filed: Dec. 26, 2013

Related U.S. Application Data

(63) Continuation of application No. PCT/CN2012/087879, filed on Dec. 28, 2012.

(51) Int. Cl.
*G11C 8/00* (2006.01)

(52) U.S. Cl.
USPC ...... 365/230.01; 707/692; 707/693; 707/694; 707/696; 707/690; 707/661; 707/673; 707/687

(58) Field of Classification Search
USPC ............. 365/230.01; 707/692, 693, 694, 696, 707/690, 661, 673, 687
See application file for complete search history.

(56) References Cited

U.S. PATENT DOCUMENTS

| | | | | |
|---|---|---|---|---|
| 6,785,684 | B2* | 8/2004 | Adbo | 707/693 |
| 7,184,577 | B2* | 2/2007 | Chen et al. | 382/118 |
| 7,647,331 | B2* | 1/2010 | Li et al. | 382/218 |
| 8,488,883 | B2* | 7/2013 | Gutelzon et al. | 382/176 |
| 8,542,869 | B2* | 9/2013 | He et al. | 382/100 |
| 8,611,649 | B2* | 12/2013 | Jia | 382/165 |
| 2008/0270729 | A1 | 10/2008 | Reddy et al. | |

FOREIGN PATENT DOCUMENTS

| | | |
|---|---|---|
| CN | 101882141 A | 11/2010 |
| CN | 102222085 A | 10/2011 |
| CN | 102456059 A | 5/2012 |

* cited by examiner

*Primary Examiner* — Viet Q Nguyen
(74) *Attorney, Agent, or Firm* — Huawei Technologies Co., Ltd.

(57) ABSTRACT

Embodiments of the present invention provide a data processing method and apparatus. According to the embodiments of the present invention, when it is found that a data hash value in a currently received data stream exceeds a preset first threshold, a part or all of data in the data stream is not deduplicated, and is directly stored, so as to prevent the data in the data stream from being dispersedly stored into a plurality of storage areas; instead, the part or all of the data is stored into a storage area in a centralized manner, so that a deduplication rate is effectively improved on the whole, particularly in a scenario of large data storage amount.

16 Claims, 4 Drawing Sheets

DATA PROCESSING METHOD AND APPARATUS

CROSS-REFERENCE TO RELATED APPLICATIONS

This application is a continuation of International Application No. PCT/CN2012/087879, filed on Dec. 28, 2012, which is hereby incorporated by reference in its entirety.

TECHNICAL FIELD

Embodiments of the present invention relate to a storage technology, and in particular, to a data processing method and apparatus.

BACKGROUND

Data deduplication (briefly referred to as deduplication) is also referred to as intelligent compression or single instance storage, and is a storage technology capable of automatically searching for duplicate data, reserving only a unique copy of the same data, and replacing other duplicate copies with a pointer that points to a single copy, so as to eliminate redundant data and reduce a storage capacity demand.

In a data deduplication solution in the prior art, received data is partitioned to obtain data blocks, and then the data blocks form several data segments, an eigenvalue of each data segment is obtained through calculation by using a certain method, and a data segment is represented by an eigenvalue that is obtained through calculation. The eigenvalue of the data segment is matched with an eigenvalue of data stored in a system, a storage area to which a storage address points is used as a similar storage area, where the storage address corresponds to an eigenvalue in the system obtained through matching, data in the similar storage area is loaded into a cache, and duplicate data query is performed on the received data.

The inventor finds in research that, in existing data deduplication, for example, data received for the first time is stored as new data; when data received for the second time changes relative to the data received for the first time, changing data is stored separately as new data; when data received for the third time and the data received for the second time are the same, data that is the most similar to the data received for the third time is probably still the data received for the first time; and in this way, relative to the data that changes for the first time, it is still considered that changing data is new data and is stored, while actually, the changing data has already been stored, and therefore it can be seen that in deduplication processing in the prior art, the more the stored data is, the more the storage areas where the data is dispersed are, and the whole deduplication performance is reduced.

SUMMARY

Embodiments of the present invention provide a data processing method and apparatus, so as to effectively increase a deduplication rate of a storage system.

To achieve the inventive purpose, in a first aspect, an embodiment of the present invention provides a data processing method, including:

receiving a data stream, and acquiring eigenvalues that represent data in the data stream;

searching, according to a set index table, for a first storage address corresponding to each of the eigenvalues, where correspondence between an eigenvalue and a storage address where data represented by the eigenvalue is located is stored in the index table;

acquiring n second storage addresses from the first storage addresses according to a set policy, where n is greater than or equal to 1; and when the number of the second storage addresses exceeds a set first threshold, directly regarding data in the received data stream as new data, and storing the new data into a storage space.

In combination with the first aspect, in a first possible manner of the first aspect, the method further includes:

when the number of the second storage addresses does not exceed the set first threshold, comparing the data in the data stream with data in storage spaces to which the second storage addresses point, and searching for duplicate data.

In combination with the first possible manner of the first aspect, in a second possible manner, after the receiving the data stream, the method further includes: segmenting the data in the data stream to obtain m data segments, where m is an integer that is greater than 1.

The comparing the data in the data stream with data in storage spaces to which the n second storage addresses point, and searching for duplicate data includes:

comparing the data in the data stream with data in storage spaces to which the n second storage addresses point; and for any one of the data segments, if data in a data segment exists in storage spaces to which S different second storage addresses point, and the value of S exceeds a set second threshold, directly storing all the data in the data segment into a storage space as new data, where S is an integer that is greater than or equal to 1 and less than n.

In combination with the second possible manner of the first aspect, in a third possible manner, the comparing the data in the data stream with data in storage spaces to which the second storage addresses point, and searching for duplicate data further includes:

for any one of the data segments, if the data in the data segment exists in the storage spaces to which the S different second storage addresses point, but the value of S does not exceed the set second threshold, regarding data in the data segment as new data, where the data is not found through search in the storage spaces to which the n second storage addresses point; and storing the new data into a storage space.

In combination with the first aspect or the first possible manner of the first aspect or the second possible manner of the first, in a fourth possible manner, the storing the new data into a storage space includes:

storing the new data in a cache; and selecting a target storage address used for writing data in the cache, and when a preset writing condition is satisfied, writing the data in the cache into a storage space to which the selected target storage address points, where the size of the written data and the size of the storage space to which the target storage address points are the same.

In combination with the fourth possible manner of the first aspect, in a fifth possible manner, the method further includes: at the time of writing the data in the cache into a storage space to which the selected target storage address points, recording data writing time of the storage space into which the data is written.

The acquiring a similar second storage address from the first storage addresses according to a set selection policy includes:

counting hits of the first storage addresses, and screening all the hit first storage addresses, where the screening includes: for the first storage addresses with the same hits, according to recorded time at which data is written into storage spaces to which the first storage addresses point, selecting the first storage address with latest time at which data is stored as an object used for selecting a similar second storage address; and selecting, according to the set selection policy, a similar second storage address from the first storage addresses that are obtained after the screening.

In a second aspect, an embodiment of the present invention provides a data processing apparatus, including:

a receiving unit, configured to receive a data stream;

an eigenvalue acquiring unit, configured to acquire eigenvalues that represent data in the data stream;

a first address acquiring unit, configured to search, according to a set index table, for a first storage address corresponding to each of the eigenvalues, where correspondence between an eigenvalue and a storage address where data represented by the eigenvalue is located is stored in the index table;

a second address acquiring unit, configured to acquire n second storage addresses from the first storage addresses according to a set policy, where n is greater than or equal to 1;

a first determining unit, configured to: when it is determined that the number of the second storage addresses exceeds a set first threshold, directly regard data in the received data stream as new data; and a storage unit, configured to store the new data into a storage space.

In combination with the first aspect, in the first possible manner, the first determining unit is further configured to: when it is determined that the number of the second storage addresses does not exceed the set first threshold, trigger a searching unit.

The searching unit is configured to compare the data in the data stream with data in storage spaces to which the second storage addresses point, and search for duplicate data.

In combination with the first possible manner of the first aspect, in the second possible manner, the apparatus further includes: a segmenting unit, configured to segment the data in the data stream to obtain m data segments, where m is an integer that is greater than 1.

The searching unit includes:

a comparing sub-unit, configured to compare data in the data segments with the data in the storage spaces to which the n second storage addresses point, determine, through search, whether the same data exists, and send a searching result; and a second determining sub-unit, configured to receive the searching result sent by the comparing unit; and for any one of the data segments, if data in a data segment exists in storage spaces to which S different second storage addresses point, and the value of S exceeds a set second threshold, directly store all the data in the data segment into a storage space through the storage unit as new data, where S is an integer that is greater than or equal to 1 and less than n.

In combination with the second possible manner of the first aspect, in the third possible manner, the second determining sub-unit is further configured to: for any one of the data segments, if the data in the data segment exists in the storage spaces to which the S different second storage addresses point, but the value of S does not exceed the set second threshold, regard data in the data segment as new data, where the data is not found through search in the storage spaces to which the n second storage addresses point, and store the new data into a storage space through the storage unit.

In combination with the first aspect or the first possible manner, the second possible manner, or the third possible manner of the first aspect, in a fourth possible manner, the storage unit includes:

a cache sub-unit, configured to store the new data in a cache; and a storage sub-unit, configured to select a target storage address used for writing data in the cache, and when a preset writing condition is satisfied, write the data in the cache into a storage space to which the selected target storage address points, where the size of the written data and the size of the storage space to which the target storage address points are the same.

In combination with the fourth possible manner of the first aspect, in a fifth possible manner, the storage sub-unit is further configured to: at the time of writing the data in the cache into a storage area to which the selected target storage address points, record data writing time of the storage area into which the data is written.

The second address acquiring unit is specifically configured to count hits of the first storage addresses, and screen all the hit first storage addresses, where the screening includes: for the first storage addresses with the same hits, according to recorded time at which data is written into storage spaces to which the first storage addresses point, selecting the first storage address with latest time at which data is stored as an object used for selecting a similar second storage address; and select, according to a set selection policy, a similar second storage address from the first storage addresses that are obtained after the screening.

According to the embodiments of the present invention, when it is found that a data hash value in a currently received data stream exceeds a preset first threshold, a part or all of data in the data stream is not deduplicated, and is directly stored, so as to prevent the data in the data stream from being dispersedly stored into a plurality of storage areas. Because the data is aggregated, a data deduplication rate is apparently improved on the whole, particularly in a scenario of large data storage amount.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The embodiments of the present invention may be applied to a storage system, the storage system may include a plurality of physical nodes, and may also include only one physical node, which is not limited in the embodiments of the present invention. A physical node having a deduplication engine may be used as an executing subject of the embodiments of the present invention, and execute a method in an embodiment of the present invention after receiving a deduplication task.

Figure 1:
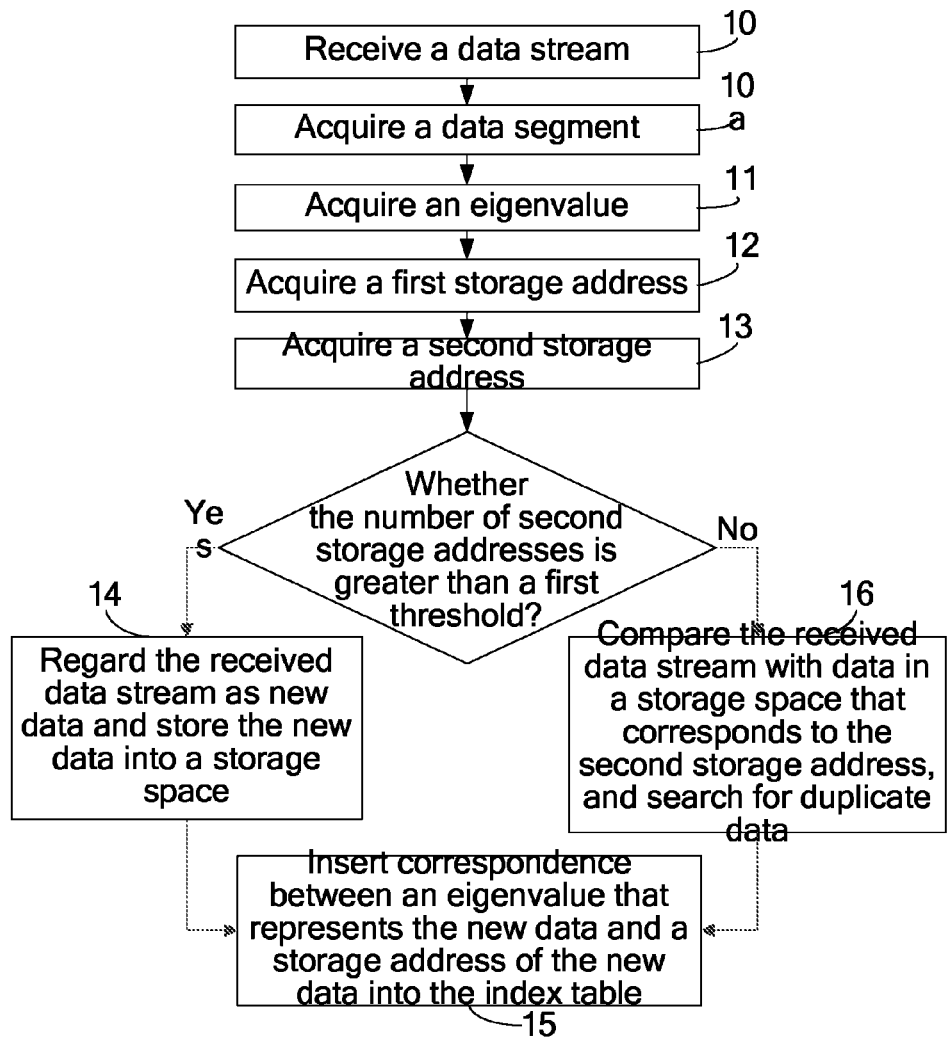
FIG. 1 is a flow chart of a data processing method according to an embodiment of the present invention.

FIG. 1 is a flow chart of a data processing method according to an embodiment of the present invention. As shown in FIG. 1, the method may include:

Step 10: Receive a data stream.

Step 11: Acquire eigenvalues that represent data in the data stream.

A method for acquiring the eigenvalues of the data in the received data stream may be obtained in many manners. For example, the data is divided into data blocks, a plurality of data blocks forms one data segment, thereby obtaining a plurality of data segments, and a minimum hash value is extracted from hash values of data blocks in each data segment as an eigenvalue of a data segment where the minimum hash value belongs. In addition, eigenvalues of a data stream may be further obtained in many manners, reference may be made to the prior art, which is not limited in the embodiment of the present invention.

Step 12: Search, according to a set index table, for a first storage address corresponding to each of the eigenvalues, where correspondence between an eigenvalue and a storage address where data represented by the eigenvalue is located is stored in the index table.

Data blocks and fingerprint information corresponding to the data blocks are stored in storage areas to which different storage addresses point. In specific implementation, a storage area to which one storage address points may have a plurality of groups of data, and if one eigenvalue is selected in each group, a case that one storage address corresponds to a plurality of different eigenvalues occurs, and therefore the same storage address in an index table may correspond to a plurality of different eigenvalues, but the same eigenvalue corresponds to one storage address. In the embodiment of the present invention, a storage area to which a storage address points and a storage space to which a storage address points have the same meaning, but only are different expression manners.

Step 13: Acquire n second storage addresses from the first storage addresses according to a set policy, where n is greater than or equal to 1.

A similar second storage address means that data stored in a storage area to which a second storage address points is similar to the data in the received data stream, and possibly, duplicate data is much.

The index table is stored in a memory in the storage according to a set policy, and data blocks and fingerprint information corresponding to the data blocks are stored in storage areas to which different storage addresses point. A storage area corresponding to one storage address has several pieces of data, and if a plurality of eigenvalues is selected from the data in the storage area, a case that one storage address corresponds to a plurality of different eigenvalues occurs, and therefore the same storage address in an index table may correspond to a plurality of different eigenvalues, but the same eigenvalue corresponds to one storage address. When a plurality of eigenvalues of the received data stream is queried in an index table, a plurality of corresponding first storage addresses may be obtained, and the first storage address corresponding to an eigenvalue of the received data stream is referred to as a hit first storage address.

There may be a plurality of policies for selecting a second storage address from the obtained plurality of first storage addresses, and the policies are set by a user, for example:

A first storage address, hits of which exceed a preset third threshold, is selected from the first storage addresses as a similar second storage address; or, all different hit first storage addresses are regarded as second storage addresses; or, hits of different first storage addresses are counted, the hits are sequenced in descending order, and different first storage addresses with the same hits are sequenced with the same serial number; and then first storage addresses with previous N serial numbers are selected. For example, hits of a storage address 1 is 3, hits of a storage address 2 is 4, and hits of a storage address 3 is also 4, and when the storage addresses 1, 2 and 3 are sequenced, serial numbers of the storage addresses 2 and 3 both are 2. If a preset policy is to select previous two first storage addresses as second storage addresses, the number of second storage addresses is three, and the second storage addresses include: the storage addresses 1, 2 and 3.

Step 14: When the number of the second storage addresses exceeds a set first threshold, directly regard the data in the received data stream as new data, and store the new data into a storage space.

The new data is data that is not stored in a storage system; and definitely, in specific implementation, the new data is considered by an executing subject, in a duplicate data searching process, as data that is not stored in the storage system, and is not objectively considered as data that definitely does not exist in the storage system.

The user sets a first threshold, and when the number of the second storage addresses exceeds the first threshold, it means that the data in the received data stream possibly exists dispersedly in the second storage addresses the number of which exceeds the first threshold, and therefore the first threshold may also be referred to as a hash value of a data stream. In this case, if the received data stream further includes new data, the new data may be re-stored in a storage area to which another storage address except the second storage addresses points; while in the embodiment of the present invention, in this case, the data in the received data stream is regarded as new data and is stored, so as to prevent the data in the received data stream from being dispersedly stored into storage areas to which a plurality of storage addresses points.

In the embodiment of the present invention, when the number of the second storage addresses exceeds the preset first threshold, a part or all of the data in the received data stream is regarded as new data, the amount of data of received data that specifically needs to be used as new data may be set by the user according to an actual situation, for example, set according to a data percentage, which is not limited in the embodiment of the present invention.

Figure 2:
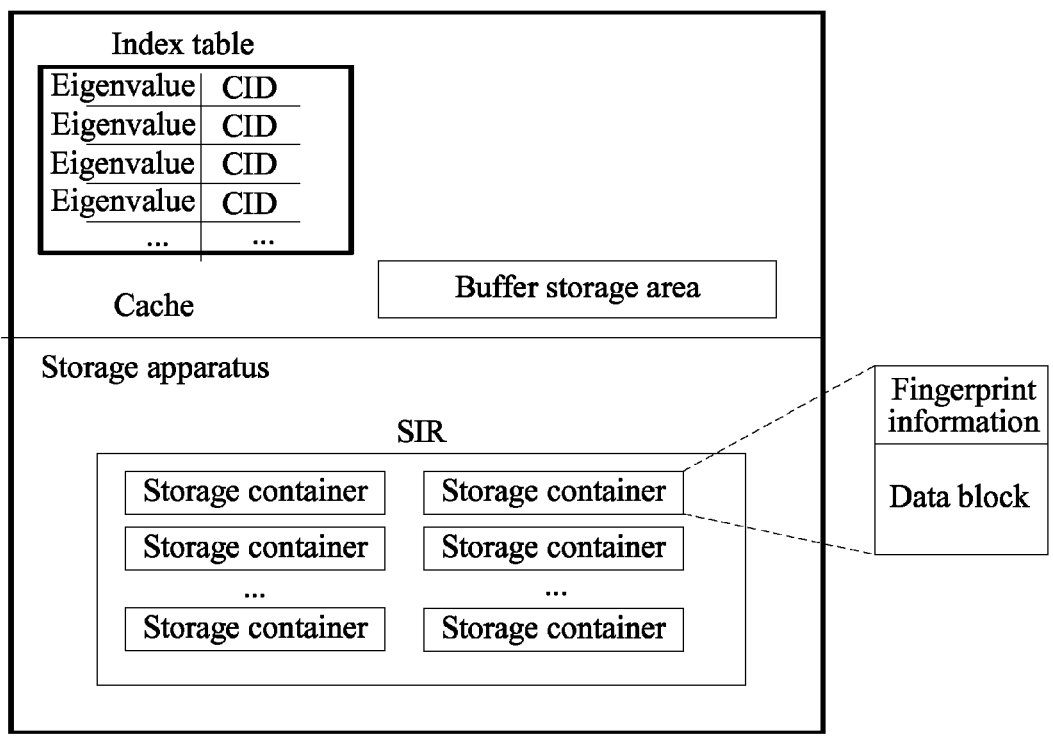
FIG. 2 is a schematic diagram of an internal structure of a physical node according to an embodiment of the present invention.

For an exemplary schematic diagram of an internal structure of a physical node in an embodiment of the invention, reference may be made to FIG. 2. A physical node executing a deduplication task further includes a storage apparatus, which enables each physical node to save data for a long time, and the storage apparatus may be a disk, and may also be another storage apparatus, such as SSD, and a storage apparatus on each physical node is referred to as a single instance repository (single instance repository, SIR). A storage apparatus of a physical node has many storage areas. In a redundant arrays of inexpensive disks (Redundant Arrays of Inexpensive Disks, RAID) system, one storage area may be regarded as one stripe, each storage area may be visually considered as one container (container) that stores data in specific implementation, each storage container has one number, which may be referred to as a storage container identity (container ID, CID), and this container identity indicates a position of this storage container in a storage system, for example: indicates that this storage container is in which storage area on which physical node in the storage system. Then, a storage address of a stored data block mentioned above is presented as a CID in specific implementation, indicating that the data block is stored in which storage area on which physical node, and for an eigenvalue, the aforementioned correspondence between an eigenvalue in an index table and a storage address of a stored data block represented by the eigenvalue may be embodied as correspondence between an eigenvalue and a CID in specific implementation; and in addition to a data block, fingerprint information corresponding to the data block may further be stored in each storage area.

A storage apparatus of a physical node has many storage areas. Each storage area may be visually considered as one container (container) that stores data in specific implementation, each storage container has one number, which may be referred to as a storage container identity (container ID, CID), and this container identity indicates a position of this storage container in a storage system, for example: indicates that this storage container is in which storage area on which physical node in the storage system. Then, a storage address of a stored data block mentioned above is presented as a CID in specific implementation, indicating that the data block is stored in which storage area on which physical node, and the aforementioned correspondence between an eigenvalue in an index table and a storage address of a stored data block represented by the eigenvalue may be embodied as correspondence between an eigenvalue and a CID in specific implementation; and in addition to a data block, fingerprint information corresponding to the data block may further be stored in each storage area.

Data in a container buffer in a cache where the new data is stored is wholly written into a container of a storage apparatus of a physical node, and the size of each storage area in a cache for storing data and the size of each storage area on a target physical node to which data is migrated are the same, that is, the size of each container buffer and the size of each container are the same; generally only after one container is fully stored with data, data can be written into a new container. A storage area in a cache of a current physical node is used for temporarily storing new data that is found through search in a data deduplication process, that is to say, data in one storage area in the cache includes data that is considered by the current physical node as new data in a duplicate data searching process, no matter whether methods for acquiring the new data are the same.

Therefore, the regarding a part or all of the data in the received data stream as new data and storing the new data into a storage space may be implemented through the following method.

The part or all of the data in the received data stream is regarded as new data and stored in a cache; and a target storage address used for writing data in the cache is selected, and when a preset writing condition is satisfied, the data in the cache is written into a storage area to which the selected target storage address points, where the size of the written data and the size of the storage area to which the target storage address points are the same.

In specific implementation, a cache has at least one container buffer, and when one container buffer is fully stored with data, the data in the container buffer may be written into a container corresponding to a storage address that is selected in a storage apparatus.

Step 15: Insert correspondence between an eigenvalue that represents the new data and a storage address of the new data into the index table.

An index table is stored on a physical node, and correspondence between an eigenvalue and a storage address of a stored data block represented by the eigenvalue is stored in the index table.

It can be seen from the foregoing embodiment that, when it is found that a data hash value in a currently received data stream exceeds a preset first threshold, a part or all of data in the data stream is not deduplicated, and is directly stored, so as to prevent the data in the data stream from being dispersedly stored into a plurality of storage areas, and a deduplication rate in current data deduplication is reduced; but the received data stream is not lost, and is stored into a storage area in a centralized manner, and the deduplication rate is improved in next data deduplication, and therefore a data deduplication rate is apparently improved on the whole, particularly in a scenario of large data storage amount. For example, data received for the first time is 123; after the data is stored as new data, data received for the second time is 124, 4 is separately stored in one storage area as new data in the prior art, and when the data 124 is received for the third time, a most similar storage area is still an area for storing the data 123, and then 4 is still used as new data; while in the solution in the embodiment of the present invention, when a certain condition is satisfied, the data 124 received for the second time is directly stored in one storage area as new data, and when the data 124 is received for the third time, it is found, through search, that the most similar storage area includes 124, and therefore 4 is not stored as new data again.

If the number of the second storage addresses does not exceed the first threshold, the implementation of the present invention further includes:

Step 16: When the number of the second storage addresses does not exceed the set first threshold, compare the data in the data stream with data in storage spaces to which the second storage addresses point, and search for duplicate data.

After the receiving the data stream in step 10 in the embodiment of the present invention, the following step may further be included.

Step 10a: Segment the received data stream to obtain m data segments, where m is an integer that is greater than 1.

Correspondingly, the comparing the data in the data stream with data in storage spaces to which the n second storage addresses point, and searching for duplicate data in step 16 includes:

comparing the data in the data stream with data in storage spaces to which the n second storage addresses point; and for any one of the data segments, if data in a data segment exists in storage spaces to which S different second storage addresses point, and the value of S exceeds a set second threshold, directly storing all the data in the data segment into a storage space as new data; and skipping to step 15, where S is an integer that is greater than or equal to 1 and less than n.

By skipping to step 15, correspondence between an eigenvalue of a data segment that satisfies a condition and a storage address of data in the data segment that is obtained through determination is inserted into the index table.

The comparing the data in the data stream with data in storage spaces to which the n second storage addresses point, and searching for duplicate data in step 16 may further include:

for any one of the data segments, if the data in the data segment exists in the storage spaces to which the S different second storage addresses point, but the value of S does not exceed the set second threshold, regarding data in the data segment as new data, where the data is not found through search in the storage spaces to which the n second storage addresses point; and storing the new data into a storage space; and skipping to step 15.

By skipping to step 15, correspondence between new data in a data segment and a storage address of the new data in the data segment is inserted into the index table.

In the embodiment of the present invention, in a duplicate data searching process, in addition to determining a hash value of a data stream, a hash value of a data segment is further determined, and when it is found that data in the data segment exists in a storage area excessively dispersedly, the data in the data segment is regarded as new data for processing, thereby better aggregating the data, so as to more precisely determine, during subsequent deduplication, whether the data is duplicate data, and improve a deduplication rate.

In the embodiment of the present invention, at the time of selecting a second storage address, first storage addresses used as objects for selecting second storage addresses may be screened, and then a similar second storage address is selected, according to a set policy, from the first storage addresses that are obtained after the screening, and therefore the embodiment of the present invention further includes:

at the time of writing the data in the cache into a storage space to which the selected target storage address points, recording data writing time of the storage space into which the data is written.

Correspondingly, the acquiring a similar second storage address from the first storage addresses according to a set selection policy in step 13 in the embodiment of the present invention may include:

counting hits of the first storage addresses, and screening all the hit first storage addresses, where the screening includes: for the first storage addresses with the same hits, according to recorded time at which data is written into spaces corresponding to the first storage addresses, selecting the first storage address with latest time at which data is stored as an object used for selecting a similar second storage address; and selecting, according to the set selection policy, a similar second storage address from the first storage addresses that are obtained after the screening.

In specific implementation, a storage area with latest data writing time means that data of the area is relatively new, and if it is distinguished according to coldness and hotness of data, data with latest writing time is probably hotter, and therefore among the first storage addresses with the same hits, a storage address with latest data writing time is selected preferably. For example, hits of a first storage address 1 is five times, hits of a first storage address 2 is three times, hits of a first storage address 3 is three times, hits of a first storage address 4 is three times, hits of a first storage address 5 is twice, and then according to the method in the embodiment of the present invention, the first storage addresses with the hits that are three times are screened first. If data storing time of the first storage address 3 is the latest, objects used for selecting a second storage address after the screening include only: the first storage address 1, the first storage address 3, and the first storage address 5, and then, a similar second storage address is selected from the first storage addresses 1, 3, and 5 according to a set selection policy.

In the embodiment of the present invention, when it is found that a data hash value in a currently received data stream exceeds a preset first threshold, a part or all of data in the data stream is not deduplicated, and is directly stored, so as to aggregate excessively dispersed data in a storage apparatus, and improve a deduplication rate on the whole, particularly in a case of mass data storage.

An embodiment of the present invention further provides a data processing apparatus, which is applicable to a storage system, disposed in a physical node in the storage system, and configured to execute the data processing method described in the foregoing method embodiment, and during specific implementation, the data processing apparatus may be a deduplication engine.

Figure 3:
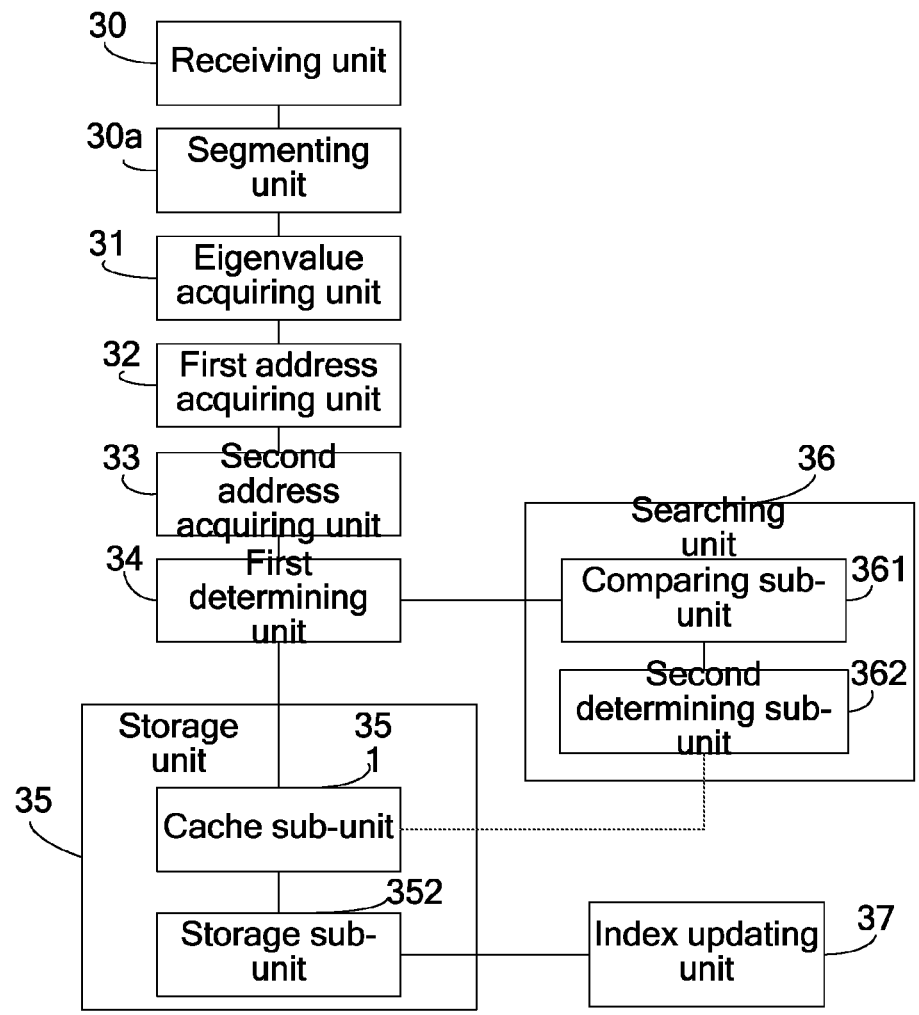
FIG. 3 is a structural diagram of a data processing apparatus according to an embodiment of the present invention.

Referring to FIG. 3, the data processing apparatus provided in the embodiment of the present invention may include:

a receiving unit 30, configured to receive a data stream;

an eigenvalue acquiring unit 31, configured to acquire eigenvalues that represent data in the data stream, where the eigenvalue acquiring unit 31 acquires the eigenvalues of the data in the received data stream in a plurality of manners during specific implementation, and reference may be made to the description in the method embodiment;

a first address acquiring unit 32, configured to search, according to a set index table, for a first storage address corresponding to each of the eigenvalues, where correspondence between an eigenvalue and a storage address where data represented by the eigenvalue is located is stored in the index table; and a second address acquiring unit 33, configured to acquire n second storage addresses from the first storage addresses according to a set policy, where n is greater than or equal to 1.

A similar second storage address means that data stored in a storage area to which a second storage address points is similar to the data in the received data stream, and possibly, duplicate data is much.

The index table is stored in a memory in the storage according to a set policy, and data blocks and fingerprint information corresponding to the data blocks are stored in storage areas to which different storage addresses point. A storage area corresponding to one storage address has several pieces of data, and if a plurality of eigenvalues is selected from the data in the storage area, a case that one storage address corresponds to a plurality of different eigenvalues occurs, and therefore the same storage address in an index table may correspond to a plurality of different eigenvalues, but the same eigenvalue corresponds to one storage address. When a plurality of eigenvalues of the received data stream is queried in an index table, a plurality of corresponding first storage addresses may be obtained, and the first storage address corresponding to an eigenvalue of the received data stream is referred to as a hit first storage address.

There may be a plurality of policies for selecting a second storage address from the obtained plurality of first storage addresses, which is not limited in the embodiment of the present invention.

A first determining unit 34 is configured to: when it is determined that the number of the second storage addresses exceeds a set first threshold, directly regard data in the received data stream as new data.

In the embodiment of the present invention, the first determining unit 34 is specifically configured to: when the number of the second storage addresses exceeds the preset first threshold, regard a part or all of the data in the received data stream as new data.

The amount of data of received data that specifically needs to be used as new data may be set by a user according to an actual situation, for example, set according to a data percentage, which is not limited in the embodiment of the present invention.

A storage unit 35 is configured to store the new data into a storage space.

Optionally, the storage unit 35 includes:

a cache sub-unit 351, configured to store the new data in a cache; and a storage sub-unit 352, configured to select a target storage address used for writing data in the cache, and when a preset writing condition is satisfied, write the data in the cache into a storage space to which the selected target storage address points, where the size of the written data and the size of the storage space to which the target storage address points are the same.

Optionally, the storage sub-unit 352 is further configured to: at the time of writing the data in the cache into a storage area to which the selected target storage address points, record data writing time of the storage area into which the data is written.

On such a basis, the second address acquiring unit 33 is specifically configured to count hits of the first storage addresses, and screen all the hit first storage addresses, where the screening includes: for the first storage addresses with the same hits, according to recorded time at which data is written into storage spaces to which the first storage addresses point, selecting the first storage address with latest time at which data is stored as an object used for selecting a similar second storage address; and select, according to a set selection policy, a similar second storage address from the first storage addresses that are obtained after the screening.

With the apparatus provided in the embodiment of the present invention, when a first determining unit finds that a data hash value in a currently received data stream exceeds a preset first threshold, data in the data stream is not deduplicated, and is directly regarded as new data, and the new data is stored by a storage unit, so as to prevent the data in the data stream from being dispersedly stored into a plurality of storage areas, so that a deduplication rate in current data deduplication is reduced; but the received data stream is not lost, and is stored into a storage area in a centralized manner, and the deduplication rate is improved in next data deduplication, and therefore a data deduplication rate is apparently improved on the whole, particularly in a scenario of large data storage amount.

Optionally, the data processing apparatus provided in the embodiment of the present invention may further include a searching unit 36.

The first determining unit 34 is further configured to: when it is determined that the number of the second storage addresses does not exceed the set first threshold, trigger the searching unit.

The searching unit 36 is configured to compare the data in the data stream with data in storage spaces to which the second storage addresses point, and search for duplicate data.

Optionally, the embodiment of the present invention may further include:

a segmenting unit 31*a*, configured to segment the data in the data stream to obtain m data segments, where m is an integer that is greater than 1.

The searching unit 36 may determine, by using a data segment as a unit, whether data in a data segment is excessively dispersed, at the time of performing duplicate data searching on data, and therefore in a case that the data processing apparatus further includes the segmenting unit 31*a*, the searching unit 36 may include:

a comparing sub-unit 361, configured to compare data in the data segments with the data in the storage spaces to which the n second storage addresses point, determine, through search, whether the same data exists, and send a searching result; and a second determining sub-unit 362, configured to receive the searching result sent by the comparing unit; and for any one of the data segments, if data in a data segment exists in storage spaces to which S different second storage addresses point, and the value of S exceeds a set second threshold, directly store all the data in the data segment into a storage space through the storage unit as new data, where S is an integer greater that is than or equal to 1 and less than n.

Optionally, the second determining unit 362 may further be configured to: for any one of the data segments, if the data in the data segment exists in the storage spaces to which the S different second storage addresses point, but the value of S does not exceed the set second threshold, regard data in the data segment as new data, where the data is not found through search in the storage spaces to which the n second storage addresses point, and store the new data into a storage space through the storage unit.

Optionally, the embodiment of the present invention may further include:

an index updating unit 37, configured to insert correspondence between an eigenvalue that represents the new data and a storage address of the new data into the index table.

With the data processing apparatus provided in the present invention, in a case that data in a data stream is excessively dispersed in a storage system, data may not be deduplicated, and is directly stored; and a data segment in the data stream may be determined, and in a case that data in the data segment is excessively dispersed, the data in the data segment is not deduplicated, thereby effectively preventing the data in the data stream from being dispersed into too many storage areas, so that a deduplication rate is improved on the whole.

Figure 4:
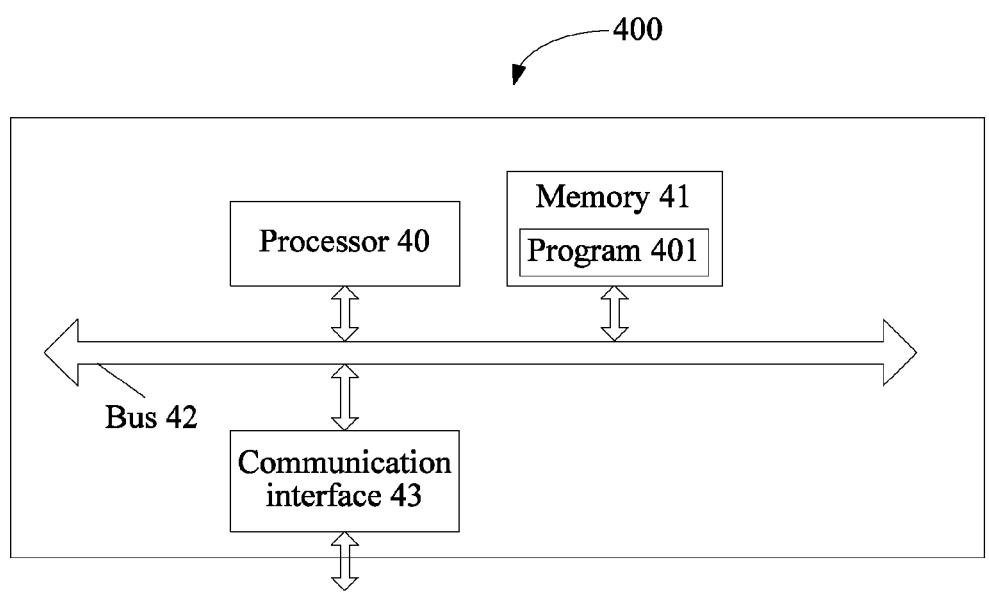
FIG. 4 is a structural diagram of another data processing apparatus according to an embodiment of the present invention.

Referring to FIG. 4, an embodiment of the present invention further provides a data processing apparatus 400, including: a processor 40, a memory 41, a bus 42, and a communication interface 43, where the processor 40, the communication interface 43, and the memory 41 are connected through the bus 42.

The memory 41 is configured to store a program 401.

The processor 40 is configured to execute the program 401 in the memory 41, where the processor 40 receives a data stream through the communication interface 43.

In specific implementation, the program 401 may include a program code, where the program code includes a computer operating instruction.

The processor 102 may be a central processing unit CPU, or an application specific integrated circuit ASIC (Application Specific Integrated Circuit), or be configured as one or more integrated circuits implementing the embodiments of the present invention.

Referring to FIG. 3, the program 401 may include:

a receiving unit 30, configured to receive a data stream;

an eigenvalue acquiring unit 31, configured to acquire eigenvalues that represent data in the data stream, where the eigenvalue acquiring unit 31 acquires the eigenvalues of the data in the received data stream in a plurality of manners during specific implementation, and reference may be made to the description in the method embodiment;

a first address acquiring unit 32, configured to search, according to a set index table, for a first storage address corresponding to each of the eigenvalues, where correspondence between an eigenvalue and a storage address where data represented by the eigenvalue is located is stored in the index table; and a second address acquiring unit 33, configured to acquire n second storage addresses from the first storage addresses according to a set policy, where n is greater than or equal to 1.

A similar second storage address means that data stored in a storage area to which a second storage address points is similar to the data in the received data stream, and possibly, duplicate data is much.

The index table is stored in a memory in the storage according to a set policy, and data blocks and fingerprint information corresponding to the data blocks are stored in storage areas to which different storage addresses point. A storage area corresponding to one storage address has several pieces of data, and if a plurality of eigenvalues is selected from the data in the storage area, a case that one storage address corresponds to a plurality of different eigenvalues occurs, and therefore the same storage address in an index table may correspond to a plurality of different eigenvalues, but the same eigenvalue corresponds to one storage address. When a plurality of eigenvalues of the received data stream is queried in an index table, a plurality of corresponding first storage addresses may be obtained, and the first storage address corresponding to an eigenvalue of the received data stream is referred to as a hit first storage address.

There may be a plurality of policies for selecting a second storage address from the obtained plurality of first storage addresses, which is not limited in the embodiment of the present invention.

A first determining unit 34 is configured to: when it is determined that the number of the second storage addresses exceeds a set first threshold, directly regard data in the received data stream as new data.

In the embodiment of the present invention, the first determining unit 34 is specifically configured to: when the number of the second storage addresses exceeds the preset first threshold, regard a part or all of the data in the received data stream as new data.

The amount of data of received data that specifically needs to be used as new data may be set by a user according to an actual situation, for example, set according to a data percentage, which is not limited in the embodiment of the present invention.

A storage unit 35 is configured to store the new data into a storage space.

Optionally, the storage unit 35 includes:

a cache sub-unit 351, configured to store the new data in a cache; and a storage sub-unit 352, configured to select a target storage address used for writing data in the cache, and when a preset writing condition is satisfied, write the data in the cache into a storage space to which the selected target storage address points, where the size of the written data and the size of the storage space to which the target storage address points are the same.

Optionally, the storage sub-unit 352 is further configured to: at the time of writing the data in the cache into a storage area to which the selected target storage address points, record data writing time of the storage area into which the data is written.

On such a basis, the second address acquiring unit 33 is specifically configured to count hits of the first storage addresses, and screen all the hit first storage addresses, where the screening includes: for the first storage addresses with the same hits, according to recorded time at which data is written into storage spaces to which the first storage addresses point, selecting the first storage address with latest time at which data is stored as an object used for selecting a similar second storage address; and select, according to a set selection policy, a similar second storage address from the first storage addresses that are obtained after the screening.

Optionally, the data processing apparatus provided in the embodiment of the present invention may further include a searching unit 36.

The first determining unit 34 is further configured to: when it is determined that the number of the second storage addresses does not exceed the set first threshold, trigger the searching unit.

The searching unit 36 is configured to compare the data in the data stream with data in storage spaces to which the second storage addresses point, and search for duplicate data.

Optionally, the embodiment of the present invention may further include:

a segmenting unit 31*a*, configured to segment the data in the data stream to obtain m data segments, where m is an integer that is greater than 1.

The searching unit 36 may determine, by using a data segment as a unit, whether data in a data segment is excessively dispersed, at the time of performing duplicate data searching on data, and therefore in a case that the data processing apparatus further includes the segmenting unit 31*a*, the searching unit 36 may include:

a comparing sub-unit 361, configured to compare data in the data segments with the data in the storage spaces to which the n second storage addresses point, determine, through search, whether the same data exists, and send a searching result; and a second determining sub-unit 362, configured to receive the searching result sent by the comparing unit; and for any one of the data segments, if data in a data segment exists in storage spaces to which S different second storage addresses point, and the value of S exceeds a set second threshold, directly store all the data in the data segment into a storage space through the storage unit as new data, where S is an integer that is greater than or equal to 1 and less than n.

Optionally, the second determining unit 362 may further be configured to: for any one of the data segments, if the data in the data segment exists in the storage spaces to which the S different second storage addresses point, but the value of S does not exceed the set second threshold, regard data in the data segment as new data, where the data is not found through search in the storage spaces to which the n second storage addresses point, and store the new data into a storage space through the storage unit.

Optionally, the embodiment of the present invention may further include:

an index updating unit 37, configured to insert correspondence between an eigenvalue that represents the new data and a storage address of the new data into the index table.

With the data processing apparatus provided in the present invention, in a case that data in a data stream is excessively dispersed in a storage system, data may not be deduplicated, and is directly stored; and a data segment in the data stream may be determined, and in a case that data in the data segment is excessively dispersed, the data in the data segment is not deduplicated, thereby effectively preventing the data in the data stream from being dispersed into too many storage areas, so that a deduplication rate is improved on the whole.

A computer program product for executing data processing provided in the embodiment of the present invention includes a computer readable storage medium storing a program code, an instruction included in the program code may be used for executing the method in the foregoing method embodiment, and for specific implementation, reference may be made to the method embodiment, which is not described herein again.

It may be clearly understood by persons skilled in the art that, for the purpose of convenient and brief description, for a detailed working process of the foregoing system, apparatus, and unit, reference may be made to a corresponding process in the foregoing method embodiment, which is not described herein again.

In the several embodiments provided in the present application, it should be understood that the disclosed system, apparatus, and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to perform all or a part of the steps of the method described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A data processing method, comprising:
   receiving a data stream, and acquiring eigenvalues that represent data in the data stream;
   searching, according to a set index table, for a first storage address corresponding to each of the eigenvalues, wherein correspondence between an eigenvalue and a storage address where data represented by the eigenvalue is located is stored in the index table;
   acquiring n second storage addresses from the first storage addresses according to a set policy, wherein n is greater than or equal to 1; and
   when the number of the second storage addresses exceeds a set first threshold, directly regarding data in the received data stream as new data, and storing the new data into a storage space.

2. The method according to claim 1, further comprising:
   when the number of the second storage addresses does not exceed the set first threshold, comparing the data in the data stream with data in storage spaces to which the second storage addresses point, and searching for duplicate data.

3. The method according to claim 2, wherein
   after the receiving the data stream, the method further comprises: segmenting the data in the data stream to obtain m data segments, wherein m is an integer that is greater than 1; and
   the comparing the data in the data stream with data in storage spaces to which the n second storage addresses point, and searching for duplicate data comprises:
   comparing the data in the data stream with data in storage spaces to which the n second storage addresses point; and for any one of the data segments, if data in a data segment exists in storage spaces to which S different second storage addresses point, and the value of S exceeds a set second threshold, directly storing all the data in the data segment into a storage space as new data, wherein S is an integer that is greater than or equal to 1 and less than n.

4. The method according to claim 3, wherein the comparing the data in the data stream with data in storage spaces to which the second storage addresses point, and searching for duplicate data further comprises:
   for any one of the data segments, if the data in the data segment exists in the storage spaces to which the S different second storage addresses point, but the value of S does not exceed the set second threshold, regarding data in the data segment as new data, wherein the data is not found through search in the storage spaces to which the n second storage addresses point; and storing the new data into a storage space.

5. The method according to any one of claim 1, wherein the directly regarding the data in the received data stream as new data and storing the new data into a storage space comprises:
   directly regarding a part or all of the data in the received data stream as new data and storing the new data into a storage space.

6. The method according to any one of claim 1, wherein the storing the new data into a storage space comprises:
   storing the new data in a cache; and selecting a target storage address, and when a preset writing condition is satisfied, writing the data in the cache into a storage space to which the selected target storage address points, wherein the size of the written data and the size of the storage space to which the target storage address points are the same.

7. The method according to claim 6, wherein
   the method further comprises: at the time of writing the data in the cache into a storage space to which the selected target storage address points, recording data writing time of the storage space into which the data is written; and
   the acquiring n second storage addresses from the first storage addresses according to a set selection policy comprises:

counting hits of the first storage addresses, and screening all the hit first storage addresses, wherein the screening comprises: for the first storage addresses with the same hits, according to recorded time at which the data is written into storage spaces to which the first storage addresses point, selecting the first storage address with latest time at which data is stored as an object used for selecting a second storage address; and selecting, according to the set selection policy, a second storage address from the first storage addresses that are obtained after the screening.

8. The method according to any one of claim 1, further comprising:
inserting correspondence between an eigenvalue that represents the new data and a storage address of the new data into the index table.

9. A data processing apparatus in a cluster system, comprising: a processor, a memory, a communication interface, and a bus, wherein the processor, the communication interface, and the memory communicate with each other through the bus;
the memory is configured to store a program; and
wherein the processor receives a data stream through the communication interface and the memory is configured to provide the processor with instructions for:
receiving a data stream, and acquiring eigenvalues that represent data in the data stream;
searching, according to a set index table, for a first storage address corresponding to each of the eigenvalues, wherein correspondence between an eigenvalue and a storage address where data represented by the eigenvalue is located is stored in the index table;
acquiring n second storage addresses from the first storage addresses according to a set policy, wherein n is greater than or equal to 1; and
when the number of the second storage addresses exceeds a set first threshold, directly regarding data in the received data stream as new data, and storing the new data into a storage space.

10. The data processing apparatus according to claim 9, wherein the memory is further configured to provide the processor with instructions for:
when the number of the second storage addresses does not exceed the set first threshold, comparing the data in the data stream with data in storage spaces to which the second storage addresses point, and searching for duplicate data.

11. The data processing apparatus according to claim 10, wherein
after the receiving the data stream, the memory is further configured to provide the processor with instructions for:
segmenting the data in the data stream to obtain m data segments, wherein m is an integer that is greater than 1; and
the comparing the data in the data stream with data in storage spaces to which the n second storage addresses point, and searching for duplicate data comprises:
comparing the data in the data stream with data in storage spaces to which the n second storage addresses point; and for any one of the data segments, if data in a data segment exists in storage spaces to which S different second storage addresses point, and the value of S exceeds a set second threshold, directly storing all the data in the data segment into a storage space as new data, wherein S is an integer that is greater than or equal to 1 and less than n.

12. The data processing apparatus according to claim 11, wherein the comparing the data in the data stream with data in storage spaces to which the second storage addresses point, and searching for duplicate data further comprises:
for any one of the data segments, if the data in the data segment exists in the storage spaces to which the S different second storage addresses point, but the value of S does not exceed the set second threshold, regarding data in the data segment as new data, wherein the data is not found through search in the storage spaces to which the n second storage addresses point; and storing the new data into a storage space.

13. The data processing apparatus according to claim 9, wherein the directly regarding the data in the received data stream as new data and storing the new data into a storage space comprises:
directly regarding a part or all of the data in the received data stream as new data and storing the new data into a storage space.

14. The data processing apparatus according to claim 9, wherein the storing the new data into a storage space comprises:
storing the new data in a cache; and selecting a target storage address, and when a preset writing condition is satisfied, writing the data in the cache into a storage space to which the selected target storage address points, wherein the size of the written data and the size of the storage space to which the target storage address points are the same.

15. The data processing apparatus according to claim 14, wherein the memory is further configured to provide the processor with instructions for: at the time of writing the data in the cache into a storage space to which the selected target storage address points, recording data writing time of the storage space into which the data is written; and
the acquiring a second storage address from the first storage addresses according to a set selection policy comprises:
counting hits of the first storage addresses, and screening all the hit first storage addresses, wherein the screening comprises: for the first storage addresses with the same hits, according to recorded time at which the data is written into storage spaces to which the first storage addresses point, selecting the first storage address with latest time at which data is stored as an object used for selecting a second storage address; and selecting, according to the set selection policy, a second storage address from the first storage addresses that are obtained after the screening.

16. A computer program product for executing data processing, comprising a computer readable storage medium storing a program code, wherein an instruction comprised in the program code is used for executing the method according to any one of claims 1 to 8.

* * * * *